May 12, 1959   L. E. WOLSKE   2,885,951
ROTISSERIE WITH AUTOMATIC BASTING MECHANISM
Filed Oct. 8, 1957   2 Sheets-Sheet 1
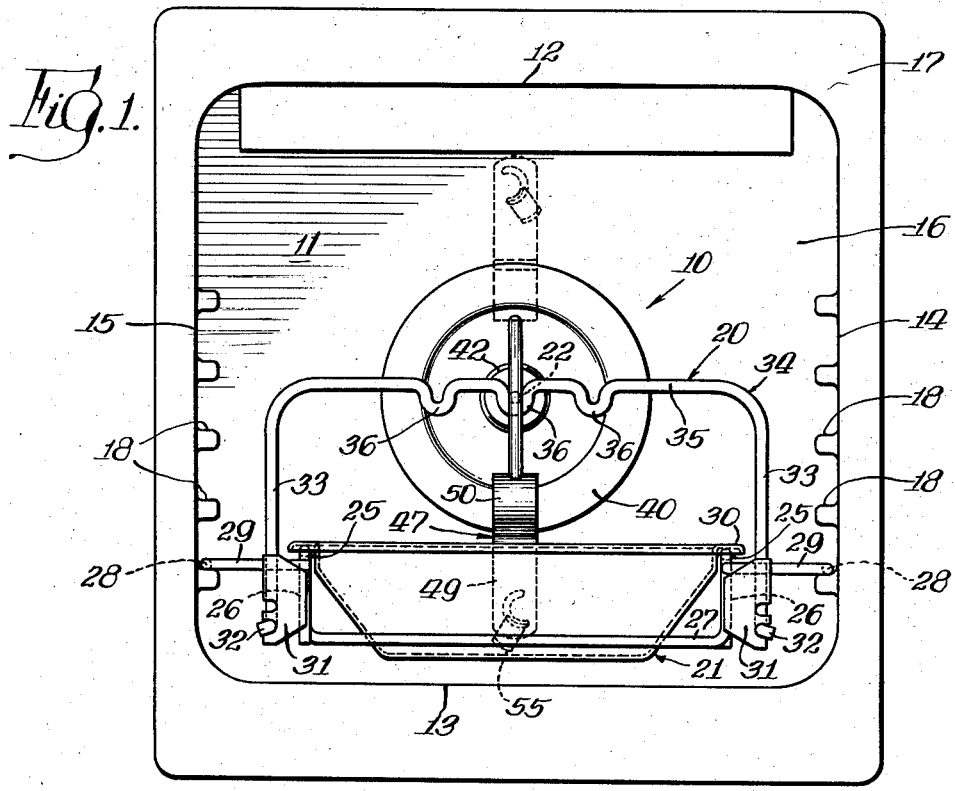
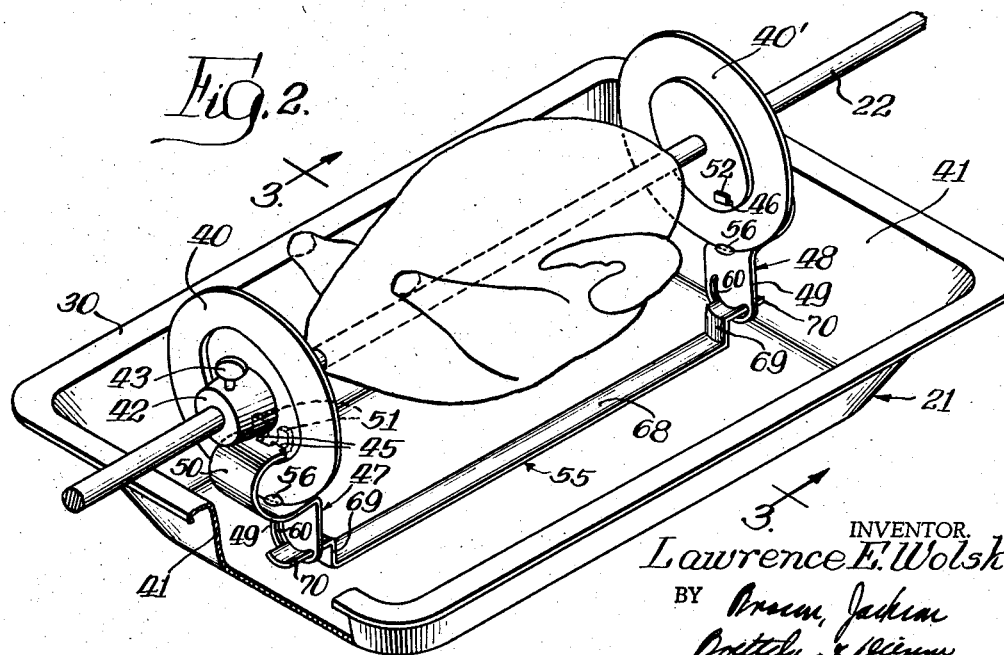
INVENTOR.
Lawrence E. Wolske May 12, 1959 L. E. WOLSKE 2,885,951
ROTISSERIE WITH AUTOMATIC BASTING MECHANISM
Filed Oct. 8, 1957 2 Sheets-Sheet 2
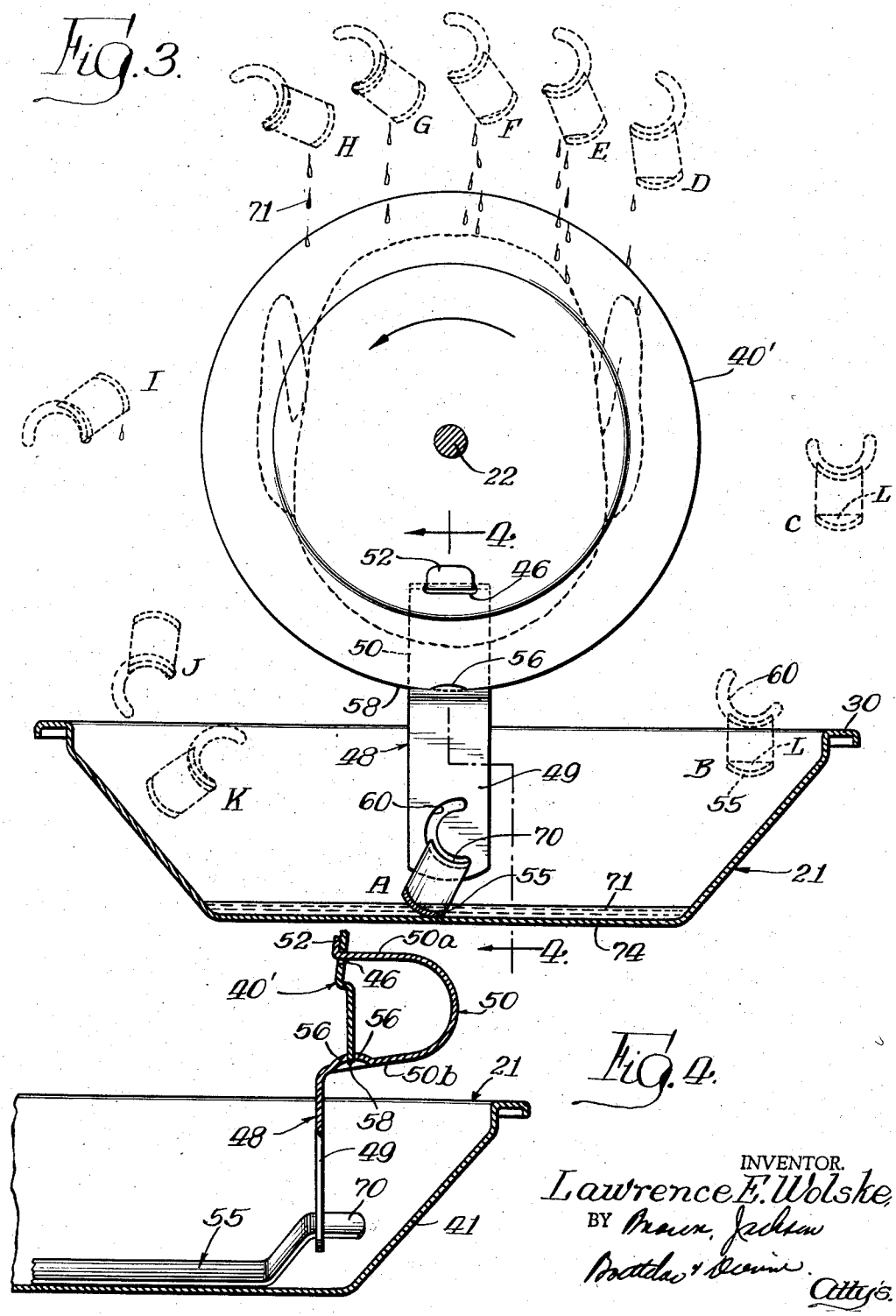
INVENTOR.
Lawrence E. Wolske,
BY
Attys.

United States Patent Office 2,885,951
Patented May 12, 1959

2,885,951
ROTISSERIE WITH AUTOMATIC BASTING MECHANISM

Lawrence E. Wolske, Benton Harbor, Mich., assignor to Whirlpool Corporation, St. Joseph, Mich., a corporation of Delaware Application October 8, 1957, Serial No. 688,916

9 Claims. (Cl. 99—346)

This invention relates generally to rotisserie apparatus for use in broiler compartments of oven stoves and like chambers. More particularly, the improvements of the present invention are directed to rotisserie apparatus having means for automatically basting foods disposed in proximity to heating means within a broiler compartment.

The apparatus of this invention embodies suitable motorized rotisserie means including a motor-driven spit upon which food to be roasted or barbecued is supported within a broiler compartment. Means are provided in association with the spit for depending a pair or more of arm members between which extend a longitudinal basting spoon disposed in radial parallelism with the food-supporting spit. Suitable provision is made for lost-motion connection between the basting spoon and its supporting arms, and the unit so coupled with the spit cooperates with a sump or drip pan therebeneath for periodically elevating basting juices or liquids from the drip pan and depositing the same gradually over food being prepared and supported on the spit. Such lost-motion connection means is so arranged as to require the automatic pouring of the basting liquids from the spoon as the latter passes over the food and thereafter to return the spoon gravitationally to a position for dipping the basting liquid from the sump or drip pan.

The main object of my invention is to provide a rotisserie apparatus having means for driving basting elements associated therewith to deposit juices and basting liquids on food items supported on a rotating spit.

It is a further object of my invention to provide a basting apparatus including a basting spoon which cooperates with a sump or drip pan for catching basting liquids and drippings from articles being cooked on a rotatable spit of a rotisserie and to elevate such basting liquids for eventual deposit over the food being cooked.

A still further object of this invention is to provide a rotisserie including a rotating spit having arm members supporting a basting spoon therebetween in which suitable lost-motion connection is afforded between the supporting arms and the said basting spoon to automatically control the movement of the spoon under the influence of gravity as it orbits with the arms about the axis of the spit so as to deposit basting liquids over the upper disposed surface of the food.

A still further object of this invention is to provide a basting apparatus and rotisserie, as aforesaid, in which the basting spoon operates substantially independently of the level of drippings in the bottom of the drip pan or sump to engage and elevate basting liquids therefrom.

A still additional object of this invention is to provide rotisserie apparatus which is easily assembled and disassembled, is efficient in operation, simple to manufacture, and dependable in its function of automatically basting foods supported on a rotatable spit thereof.

The above and further objects, features, and advantages of this invention will become apparent to those familiar in the art from the following detailed description of a preferred embodiment thereof illustrated in the accompanying drawings.

In the drawings:

Figure 1 is a front elevational view illustrating an improved rotisserie and basting device, according to this invention, as it appears in its associated relationship with a conventional oven cavity, or the like;

Figure 2 is a perspective view of the rotisserie apparatus of this invention showing the assembled relationship of the spit basting device and drip pan;

Figure 3 is a sectional view taken at 3—3 of Figure 2, but an enlarged scale thereover, showing schematically the operational sequence of the basting spoon of my invention; and Figure 4 is a cross-sectional view taken substantially along line 4—4 of Figure 3 to demonstrate details of connecting means employed in supporting the basting spoon.

Turning now to the drawings, and as seen particularly in Figure 1, my improved rotisserie apparatus, indicated generally by numeral 10 therein, is arranged to be inserted into an oven chamber or cavity 11 formed by a conventional liner which includes parallel spaced top and bottom walls 12 and 13, which are interconnected by side walls 14 and 15. Such walls are disposed in rectangular relationship, as viewed in end elevation, to define vertical and horizontal limits for the chamber 11. These walls also merge at one end with a rear wall 16 which is disposed transversely thereof, and are turned outwardly at their opposite ends in a peripheral flange 17 to define an entry or opening for the chamber 11. The oven chamber or broiler compartment so provided is normally closed by a conventional insulated door (not shown). Side walls 14 and 15 are also conventionally provided with inwardly extending ribs 18, 18 which are suitably spaced to define horizontal parallel planes for supporting a rack assembly 20 and its drip pan 21 at various levels.

In general, the details, construction, and operation of the rack assembly 20, as well as a drive assembly or means (not shown) for motorizing the spit 22 are described more fully in my copending application, Serial No. 620,402, filed November 5, 1956, and entitled, Rotisserie Apparatus. It may be stated, however, that the spit means 22 is rotatably driven by a gear reduced motor drive located outwardly of the rear wall 16 of the oven cavity through which the spit means extends when the rotisserie apparatus or assembly 10 is disposed in its operating condition in chamber 11.

The rack assembly 20 includes a pair of laterally spaced parallel side rails 25, 25 which are turned downwardly at their opposite ends to form legs 26 integrally interconnected by cross-connecting horizontal tie rails 27 (see Figure 1). Outrigger rails 28 are disposed in spaced parallelism with side rails 26 and such are interconnected at their rearward ends by a cross-connecting tie rail (not shown) and spot-welded, or otherwise rigidly affixed to the upright leg portions 26. Rails 28 at the forward end are integral with short transverse arms 29, 29 provided for connection with upright legs 26.

The drip pan 21 slides along and over the side rails 25, 25; such having a laterally disposed and outwardly extending lip portion 30 bounding its upper end. The outrigger rails 28, 28 are adapted to engage the upper edge of the guide rails or ribs 18, 18 formed in the side walls of the oven chamber, as shown best in Figure 1 of the drawings.

Suitable brackets 31, 31, there being a pair of such brackets at each end of the rack assembly 20, are mounted one to each of the downwardly disposed leg portions 26 substantially at the four corners of the rack assembly. Such brackets receive outwardly turned end portions 32, 32 formed at the lowermost ends of vertical leg portions 33 related to substantially U-shaped spit support members 34; there being one such spit support member at each end of the rack assembly.

The spit support members 34, in addition to the vertically extending leg portions 33, 33 thereon, also comprise horizontal support rail portions 35 in integral cross-connecting continuation with the spaced leg portions 33. Each horizontal support rail portion 35 includes three intended dimples 36, 36 formed intermediate its ends. Such indentations 36, 36 serve to engage, support, and define rotational axes for the central rotatably driven spit 22.

With particular reference to Figure 2 of the drawings, the spit member 22 is shown to carry a pair of parallel spaced skewer disc elements 40, 40' which are normally located inwardly of the end walls 41, 41 of the drip pan 21. Each disc 40, 40' may be provided with suitable openings for supporting skewer elements, in accordance with the teachings and concepts outlined in my above referred to application No. 620,402, or alternately may be, as shown in Figure 2, employed without skewer supporting openings. In any event, the skewer discs are normally adjustably affixed to the driven spit member 22 by suitable connective devices, providing adjustment along the axis of the spit, such as for example, an adjusting hub 42 and holding screw means 43, shown in Figure 2.

Disc 40 is provided with at least one set of laterally spaced openings 45, 45, while skewer disc 40' includes one or more through openings 46; such openings being provided for coupling engagement with basting spoon support arms 47 and 48, respectively, as will be explained presently. In this latter regard, each spit support arm includes a substantially vertical body portion 49 at the upper end of which is a reentrant neck portion 50, integral with the body portion 49. Neck portion 50 of the arm 47 bears a pair of extending finger portions 51, 51 at its outer end for insertion into the openings 45, 45 of skewer disc 40. The spoon supporting arm 48 is similar in all respects to arm 47, with the exception that only a single extending finger 52 is provided to cooperate with its associated single opening 46 in the skewer disc 40'. In this manner then, positive means is provided to assure correct assemblage of the support arms 47 and 48 in their desired relation with discs 40 and 40'. It will be further appreciated that while I have herein illustrated each skewer disc as provided with one set of openings for engaging its associated basting spoon support arm, more than one set of such arms and openings may be provided, as desired, in accordance with the number of basting spoon elements 55 to be employed.

With particular reference to Figure 4 of the drawings, it is therein shown how the skewer disc 40' is associated with the basting spoon support arm 48; disc 40 and arm 47 being similarly associated. As shown, the reentrant portion 50 of support arm 48 has diverging upper and lower arms 50a and 50b of which the former bears the upwardly turned extending finger 52. The lower arm 50b includes a detent device comprising a pair of raised semi-spherical button portions 56, 56 which are separated by an open detent slot receptive of the outer peripheral edge 58 of the skewer disc 40'. Thus, by placing the finger 52 through the opening 46 of the skewer disc 40' and snapping the outer peripheral edge of such skewer disc across the axially inner raised button 56, the edge 58 of disc 40' may be secured in the detent slot. In this operation, the reentrant configuration of the supporting arm portion 50 permits resilient flexing action to accommodate the movement of edge 58 across the said one button 56. Detachment of each basting spoon support arm from its associated skewer disc is accomplished readily by the same function of the reentrant portion 50. In essence, therefore, the association and disassociation of the basting spoon support arms with their respective skewer discs is accomplished by a simple snap-in engagement and action of the detent means; such facilitating ease of handling and operation.

The body portion 49 of each of the support arms 47 and 48 is provided, adjacent its outer end, with a semi-circular or arcuate opening 60, as is best recognized by inspecting Figures 2 and 3 of the drawings; such openings 60 of the two opposed arms 47 and 48 being registeringly aligned in assembly. In greater particular, these semi-circular openings 60 are located so that the radial centers thereof are slightly offset from the longitudinal axis of the body portions 49 for reasons which will best be understood from descriptive materials which follow.

The basting spoon 55, as best seen in Figures 2 and 4 of the drawings, comprises an elongated semi-cylindrical or curvilinear body portion 68, transversely related neck portions 69, 69 at either end of such main body portion, and semi-cylindrical arm portions 70, 70 extending from the neck portions to parallel the longitudinal axis of body portion 68. Arms 70 are adapted to enter and slidingly engage the arcuate openings 60, 60 of the support arms, with such openings 60 being registeringly aligned in the assembly of the arms 47 and 48, as noted previously.

By so providing openings 60, 60, the basting spoon 55 is allowed to travel freely along the arc thereof under the influence of gravity as the arms 47 and 48 rotate with the skewer discs 40, 40' driven with spit member 22. The openings 60 are also preferably of greater length than the width of the extending arm portions 70, 70 which they carry, so that the basting spoon is permitted to reciprocate relative to the support arms 47, 48 substantially 180° along the arc of the semi-circular openings 60 and return for each 360° of rotational movement for the spit 22. This permissible relative movement between the support arms and basting spoon affords a lost motion connection which produces the compound reciprocating movement of the basting spoon, as best illustrated in Figure 3. It will be understood from Figure 3 that during each revolution of the discs 40, 40' the basting spoon elevates drippings 71, 71 from the drip sump supply within the drip pan 21 and successfully deposits them over an article being roasted or supported on the driving spit.

Considering the basting spoon 55 and disc arrangement of Figure 3, wherein one spoon and one disc is shown for simplicity of explanation, the spoon is carried through successive stages, as indicated by the letters A–K. When spoon 55 is in position A, it drags across bottom wall 74 of the drip pan 21 to scoop up drippings 71, as therein shown. Upon continued rotation of the discs 40, 40' and spit 22, gravity requires the spoon end portions 70, 70 to move along the curvilinear arc defined by the semi-circular openings 60, thus to maintain the main body portion 68 of the spoon substantially horizontal until it reaches a position approximately as indicated at position D. In position D, the arm members 70 have reached the end of the openings 60 opposite from that at which they resided in position A. Therefore, continued rotation of the skewer discs (arms 47 and 48 being fixed on such skewer discs) produces a gradual overturning of the spoon member 55 causing drippings 71 to fall upon the underdisposed food. This depositing activity continues until approximately a ten-o'clock position is reached, as indicated by position H, while complete discharge of all drippings from the spoon takes place at substantially 270° of displacement from position A, as indicated by position I. At approximately position J, the spoon 55 is almost fully inverted from its starting position, with the openings 60 eventually depositing the center of gravity for the spoon on the opposite side of a vertical line passing through the radial center for such openings. This causes gravitational swinging movement of the spoon from its position J to that shown in K to return the same to its initial position A. This dumping activity is carried out with the rotational movement of the skewer discs 40, 40' and under the influence of gravity so that as the spoon body 68 approaches the pool of drippings or basting material in the bottom of the drip pan 21, the same is again conditioned to engage and pick up a full charge of liquid, as indicated by the liquid level, indicated by line L in Figure 3. With this activity in mind, the position of wall 74 relative to the axis of spit 22 is preferably such as to require the spoon to drag across the floor of the supply sump to insure filling the spoon without particular regard to the level of liquid therein. Thus, the filling activity for the spoon is made substantially independent of the liquid level in the sump.

From the foregoing, it is believed that those familiar with the art will appreciate the advanced improvements in the art which mark the present rotisserie device. Further, while I have herein shown and described the principles and features of my improvements in conjunction with a particular embodiment, nevertheless, it will be understood that such is subject to numerous changes, modifications, and substitutions of equivalents without necessarily departing from the spirit and scope of my invention. As a consequence, it is not my intention to be limited to the particulars of the rotisserie device as herein shown and described, except as may appear in the following appended claims.

I claim:

1. In a rotisserie apparatus for use in an oven chamber, a food supporting horizontal spit means rotatably mounted in said chamber, pan means disposed beneath said spit means for containing basting liquids, elongated basting spoon means adapted to be carried in spaced parallelism radially outward of said spit means, and arm members detachably carrying said spoon means for movement with said spit means including lost-motion connection means providing reciprocating movement of said spoon means relative to said arm members and along a limited arc radially outward of said spit means, said spoon means being disposed to normally engage the bottom wall of said pan means in its orbital movement about said spit means and to rotate sufficiently to dip basting liquid from said pan means, said lost-motion connection means serving to provide gravitationally imposed overturning and reciprocating arcuate movement of said spoon means thereby to lift basting liquids from said pan means and deposit the same over the upper side of food on said spit means and to return said spoon means to its position for dipping basting liquids from said pan means during each revolution of said spit means.

2. The combination as set forth in claim 1 wherein said lost-motion connection means comprise semi-circular openings in said arm members, the disposition and formation of said openings being such as to permit substantially 180° of arcuate reciprocating movement of said spoon means for each 360° of spit rotation.

3. For use in an oven or broiler compartment of the type defined at one end by a rear wall and behind which is a motorized drive means, a rotisserie device comprising, rack means slidingly mounted in the broiler compartment, a food supporting spit means rotatable about a horizontal axis on centers defined by said rack means, pan means carried by said rack means beneath said spit means for carrying basting liquid, said spit means being insertable through the rear wall of the compartment for driving connection with the drive means, and at least one elongated basting spoon member disposed radially outward of said spit mens and in longitudinal parallelism therewith, said spoon member being movable with the rotation of said spit means, supporting means on said spit means for holding said basting spoon member in a circular orbit radially outward of said spit means, and lost-motion connection means between said supporting means and spoon member providing relative movement between said spoon member and said spit means to periodically move said spoon member over a predetermined arcuate path and return for each 360° of rotational movement of said spit means; the relative movement of said spoon member being such as to invert the same above said spit means and return the same to a position for dipping liquids from the pan means beneath said spit means.

4. A rotisserie device for use in cooking foods, comprising, rotatable spit means for supporting food to be cooked, rack means providing bearing support adjacent opposite ends of said spit means, pan means carried by said rack means beneath said spit means, plural mounting means extending radially outward of said spit means adjacent the opposite ends of the latter, and basting spoon means extending between and carried by said mounting means parallel to said spit means and having lost-motion connection therewith providing limited arcuate movement of said spoon means relative to said mounting means in response to rotation of said spit means.

5. The combination as set forth in claim 4 in which said lost-motion connection includes arcuate openings formed in said mounting means, and said spoon means comprises an elongated member having end portions extending into said openings whereby the same is reciprocal along the arc defined thereby.

6. A rotisserie device for use in cooking foods, comprising, a drip pan means, a rotatably driven spit member disposed above said drip pan means, rack means for supporting said spit member above said drip pan means and defining a horizontal rotational axis therefor, at least one pair of arm members extending radially outward of said spit means, one adjacent each of its ends, said arm members each having an arcuate opening therethrough, and elongated basting spoon means extending between said arm members and into said openings, the extent of said arm members radially from said spit member and the location of said basting spoon means thereon causing the latter to engage and move across a substantial portion of the bottom wall of said pan means to fill itself with liquid in response to rotation of said spit member, the connection between said spoon means and said arm members providing sufficient relative motion therebetween to elevate the spoon means to a position substantially above said spit means before the same is overturned to deposit basting liquids on food carried by said spit member.

7. A rotisserie device for use in cooking foods in a broiler compartment comprising, food supporting spit means rotatably mounted in the broiler compartment, plural registeringly aligned arm members extending radially outward from adjacent opposite ends of said spit means and each provided with an opening therethrough, an elongated basting spoon means extending between said arm members and having end portions extending into said openings, said basting spoon means paralleling the longitudinal axis of said spit means, and the said openings being elongated to define a path of movement for said spoon means whereby the latter reciprocates and partially rotates about said arm members and spit means, as the latter is rotatably driven.

8. A rotisserie device for use in cooking foods comprising, support means, food supporting spit means rotatably mounted on said support means, plural registeringly aligned mounting means extending radially outward from opposite ends of said spit means with each mounting means being provided with an opening, means for rotating said spit means and said mounting means, and elongated basting spoon means extending between said plural mounting means and having end portions extending into said openings therein to provide a lost motion connection between said spoon means and each of said mounting means, said spoon means paralleling the longitudinal axis of said spit means, and said openings being elongated to define a path of movement for said spoon means in said lost motion connections whereby said spoon means is free to move in said openings relative to said spit means under the influence of gravity during the rotation of said mounting means.

9. The invention set forth in claim 8 in which said openings in said mounting means are arcuate to provide for oscillatory motion of said spoon means during the rotation of said mounting means.

References Cited in the file of this patent

UNITED STATES PATENTS

| | | |
|---|---|---|
| 785,267 | McPhaill | Mar. 21, 1905 |
| 1,487,481 | Schey | Mar. 18, 1924 |